United States Patent
Kenney

(10) Patent No.: US 10,564,942 B2
(45) Date of Patent: Feb. 18, 2020

(54) COMPILER FOR A PROCESSOR COMPRISING PRIMARY AND NON-PRIMARY FUNCTIONAL UNITS

(71) Applicant: International Business Machines Corporation, Armonk, NY (US)

(72) Inventor: Tyler J. Kenney, Upton, MA (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 15/815,716

(22) Filed: Nov. 17, 2017

(65) Prior Publication Data

US 2019/0155582 A1    May 23, 2019

(51) Int. Cl.
| | |
|---|---|
| *G06F 9/44* | (2018.01) |
| *G06F 8/35* | (2018.01) |
| *G06F 8/30* | (2018.01) |
| *G06F 9/38* | (2018.01) |
| *G06F 8/41* | (2018.01) |
| *G06F 8/36* | (2018.01) |

(52) U.S. Cl.
CPC ............... *G06F 8/35* (2013.01); *G06F 8/311* (2013.01); *G06F 8/315* (2013.01); *G06F 8/36* (2013.01); *G06F 8/441* (2013.01); *G06F 9/3836* (2013.01); *G06F 9/3887* (2013.01)

(58) Field of Classification Search
CPC . G06F 8/35; G06F 8/311; G06F 8/315; G06F 8/36; G06F 8/441; G06F 9/3826; G06F 9/3887
USPC ........................................................ 717/106
See application file for complete search history.

(56) References Cited

U.S. PATENT DOCUMENTS

| | | | |
|---|---|---|---|
| 6,446,190 B1 | 9/2002 | Barry et al. | |
| 8,839,187 B1 * | 9/2014 | Yan .................. | G06F 8/423 |
| | | | 717/104 |
| 9,009,690 B1 * | 4/2015 | Orofino, II ........... | G06F 8/443 |
| | | | 717/140 |
| 9,195,445 B1 * | 11/2015 | Shakeri ................ | G06F 9/5044 |
| 10,078,357 B2 | 9/2018 | Chung et al. | |

(Continued)

OTHER PUBLICATIONS

Clark et al., "Liquid SIMD: Abstracting SIMD Hardware using Lightweight Dynamic Mapping," High Performance Computer Architecture, (HPCA 2007), IEEE 13th International Symposium, Date of Conference: Feb. 2007, Scottsdale,Arizona, 12 pages.

(Continued)

*Primary Examiner* — Anna C Deng
(74) *Attorney, Agent, or Firm* — Yee & Associates, P.C.

(57) ABSTRACT

An apparatus and computer program product for generating executable code for a hardware architecture comprising a primary functional unit and a non-primary functional unit are provided. Source code is translated into representative primary functional unit instructions for a representative primary functional unit in a representative processor architecture model wherein functionality of the non-primary functional unit in the hardware architecture is modeled by the representative primary functional unit in the representative processor architecture model. The representative primary functional unit instructions are transformed into executable non-primary functional unit instructions for the non-primary functional unit in the hardware architecture.

6 Claims, 3 Drawing Sheets

(56) References Cited

U.S. PATENT DOCUMENTS

| | | | | |
|---|---|---|---|---|
| 2002/0194454 | A1* | 12/2002 | Weiss | G06F 9/3017 712/24 |
| 2003/0159127 | A1* | 8/2003 | Weiss | G06F 9/3017 717/106 |
| 2009/0070552 | A1 | 3/2009 | Kanstein et al. | |
| 2013/0080740 | A1 | 3/2013 | Gentle et al. | |
| 2019/0155583 | A1 | 5/2019 | Kenney | |

OTHER PUBLICATIONS

Pai et al., "PLASMA: Portable Programming for SIMD Heterogeneous Accelerators," Supercomputer Education and Research Centre, Indian Institute of Science, Jan. 2010, Bangalore, India, 10 pages.

Moreno et al., "An innovative low-power high-performance programmable signal processor for digital communications," IBM Journal of Research and Development, vol. 47, Issue 2.3, Mar. 2003, 28 pages.

Derby et al., "VICTORIA—VMX Indirect Compute Technology Oriented Towards In-Line Acceleration," Proceedings of the 3rd conference on Computing frontiers, (CF06), May 2006, Ischia, Italy, 9 pages.

Naishlos et al., "Compiler Vectorization Techniques for a Disjoint SIMD Architecture," IBM Research Report, H-0146, Haifa Research Laboratory, Nov. 2002, Haifa, Israel, 11 pages.

Nuzman et al., "Compiling for an Indirect Vector Register Architecture," Proceedings of the 5th conference on Computing frontiers, (CF08), May 2008, Ischia, Italy, 10 pages.

Lee et al., "The Hwacha Vector-Fetch Architecture Manual," Version 3.8.1, Technical Report No. UCB/EECS-2015-262, Dec. 2015, University of California at Berkeley, 46 pages.

Tyson et al., "Evaluating the Use of Register Queues in Software Pipelined Loops," IEEE Transactions on Computers, vol. 50, Issue 8, Aug. 2001, 15 pages.

Kenney et al., "Compiling for a SIMD Architecture with a Dynamically-Addressable Register File," submitted for publication to the 26th International Conference on Parallel Architectures and Compilation Techniques (PACT '17) on Mar. 14, 2017, 9 pages ("Grace Period Disclosure" under 35 U.S.C. 102(b)(1)(A)).

List of IBM Patents and Applications Treated as Related, dated Jun. 5, 2019, 2 pages.

\* cited by examiner

COMPILER FOR A PROCESSOR COMPRISING PRIMARY AND NON-PRIMARY FUNCTIONAL UNITS

STATEMENT REGARDING PRIOR DISCLOSURES BY THE INVENTOR OR A JOINT INVENTOR

The following disclosure is submitted under 35 U.S.C. § 102(b)(1)(A): DISCLOSURE: KENNEY, et al., Compiling for a SIMD Architecture with a Dynamically-Addressable Register File, submitted for publication to the 26th International Conference on Parallel Architectures and Compilation Techniques (PACT '17) on Mar. 14, 2017, 9 pages.

BACKGROUND INFORMATION

1. Field

The present disclosure relates generally to compilers for compiling computer code to run on a processor. More particularly, the present disclosure relates to a compiler for compiling computer code to run on a processor that includes primary functional units and non-primary functional units, such as a governing functional unit.

2. Background

A computer may be viewed as comprising a set of functional units. A functional unit comprising a computer may consist of a storage element and a processing element. For example, without limitation, a functional unit comprising a computer may consist of a register file for storage and a logical unit for processing. Common types of functional units for a computer may include scalar or fixed-point functional units, floating-point functional units, and vector or single-instruction multiple-data (SIMD) functional units. Other types of functional units for a computer are possible also.

A distinction may be made between primary and non-primary functional units of a computer. A primary functional unit (PFU) of a computer may be defined as any functional unit which consumes data considered to be input to a software program running on the computer as a whole or which produces data considered to be output produced by the software program running on the computer as a whole. In other words, a primary functional unit may be said to contribute directly to the running of a software program on the computer. The vast majority of functional units comprising computers in use today are such primary functional units.

Attempts to make computers perform faster, consume less power, and occupy smaller footprints have produced increasingly complex computer hardware architectures. For example, one result of such attempts to improve computers is a class of computers that feature one or more governing functional units. A governing functional unit (GFU) is a non-primary functional unit of a computer. Unlike a primary functional unit, a governing functional unit of a computer does not contribute directly to the running of a software program on the computer. Instead, a governing functional unit of a computer may affect the behavior of the primary functional units in a computer architecture to improve the operation of the primary functional units. For example, without limitation, a governing functional unit may control register addressing, instruction predication, memory addressing mode, vector length, arithmetic signedness, overflow behavior, or any other aspect or combination of aspects of operation of a primary functional unit. One or more governing functional units in a computer may control one or more aspects of operation of one or more primary functional units in a computer.

A compiler transforms computer software code written in one programming language into another computer language. Specifically, a compiler may be used to translate source code from a higher-level programming language to a lower level language to create an executable program to run on a computer. Implementing a compiler for generating computer program code to be run on a computer architecture comprising non-primary functional units, such as a governing functional unit, may be relatively complex.

Therefore, there may be a need for a method, apparatus, and computer program product that take into account at least some of the issues discussed above, as well as other possible issues.

SUMMARY

The illustrative embodiments contemplate an apparatus comprising a compiler and an instruction transformer. The compiler is configured to translate source code into representative primary functional unit instructions for a representative primary functional unit in a representative processor architecture model of a hardware architecture comprising a primary functional unit and a non-primary functional unit. The functionality of the non-primary functional unit in the hardware architecture is modeled by the representative primary functional unit in the representative processor architecture model. The instruction transformer is configured to transform the representative primary functional unit instructions into executable non-primary functional unit instructions for the non-primary functional unit in the hardware architecture.

The illustrative embodiments also contemplate a computer program product for generating executable code for a hardware architecture comprising a primary functional unit and a non-primary functional unit. The computer program product comprises a computer readable storage medium having program instructions stored thereon. First program instructions stored on the computer readable storage medium are executable by a device to cause the device to translate source code into representative primary functional unit instructions for a representative primary functional unit in a representative processor architecture model, wherein functionality of the non-primary functional unit in the hardware architecture is modeled by the representative primary functional unit in the representative processor architecture model. Second program instructions stored on the computer readable storage medium are executable by the device to cause the device to transform the representative primary functional unit instructions into executable non-primary functional unit instructions for the non-primary functional unit in the hardware architecture.

Other variations are possible, as described below.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
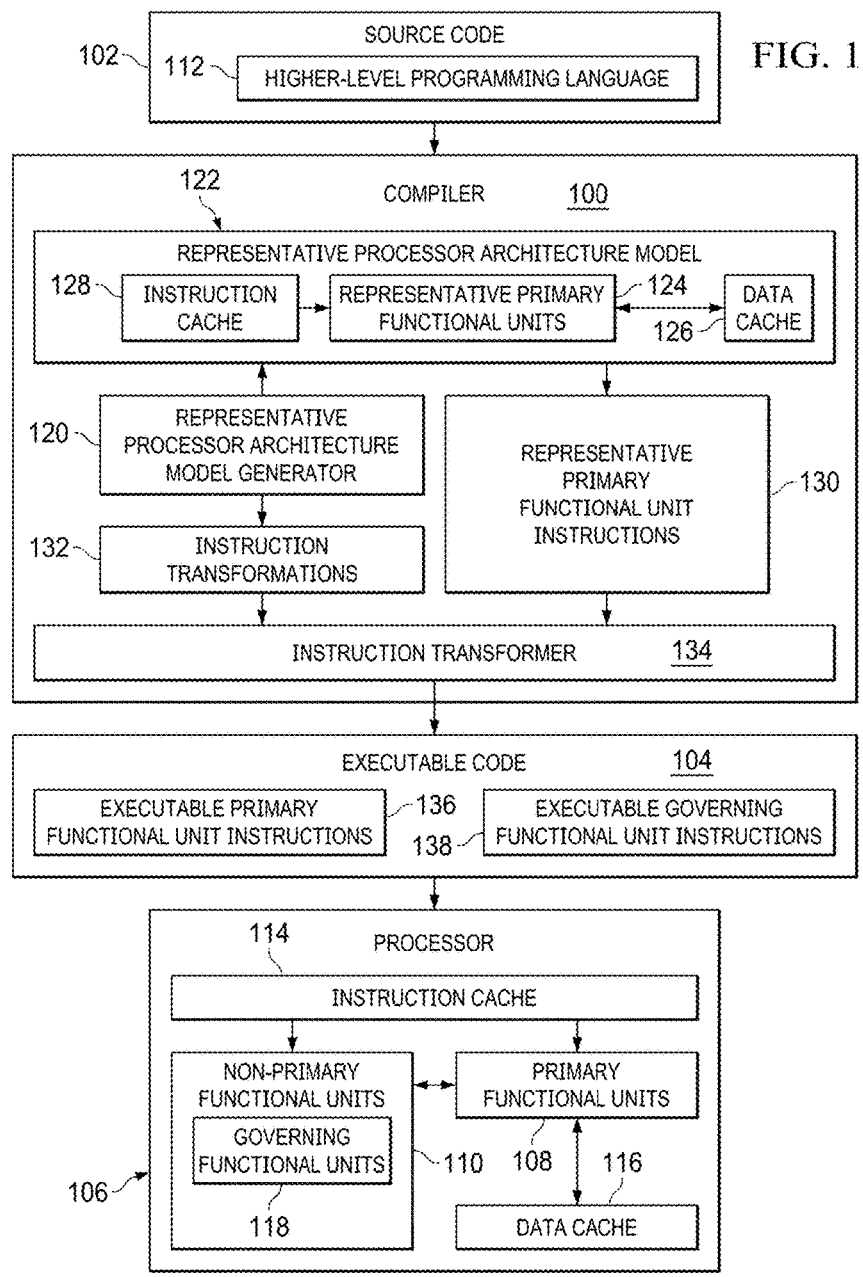
FIG. 1 is a block diagram of a compiler for a processor comprising primary and non-primary functional units in accordance with an illustrative embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments provide a computer-implemented method, apparatus, and computer program product for compiling software for running on a processor that comprises primary functional units and non-primary functional units, such as a governing functional unit. A compiler, in accordance with an illustrative embodiment, uses a representative model of the processor architecture which provides the same functionality as the processor for which the code is being compiled but with only primary functional units, that is, without a governing functional unit. A compiler using such an abstract model may benefit from code re-use for instruction selection, instruction scheduling, register allocation, and other appropriate compiler functions.

Turning to FIG. 1, a block diagram of a compiler for a processor comprising primary and non-primary functional units is depicted in accordance with an illustrative embodiment. Compiler 100 may be implemented as software that is running or that is configured to run on any appropriate computer, data processing system, or processor unit. Alternatively, or in addition, compiler 100 may be implemented in any appropriate hardware or in software in combination with any appropriate hardware.

Compiler 100 may be configured to translate source code 102 into executable code 104 for running on processor 106 that includes both primary functional units 108 and non-primary functional units 110. Source code 102 may include any appropriate software that is written in any appropriate higher-level programming language 112. Processor 106 may include any appropriate processor unit, computer, data processing system, or portion of a computer, data processing system, or other system or device that is configured to run executable code 104. Primary functional units 108 and non-primary functional units 110 may comprise elements of the hardware architecture of processor 106.

Primary functional units 108 may comprise any appropriate number of primary functional units. Primary functional units 108 may include one primary functional unit or a plurality of primary functional units. Each primary functional unit in primary functional units 108 may be controlled by or in accordance with instructions in instruction cache 114 to manipulate data in data cache 116. Instruction cache 114 and data cache 116 may comprise elements of the hardware architecture of processor 106 along with primary functional units 108 and non-primary functional units 110.

Primary functional units 108 may be defined as any functional units which consume data in data cache 116 that is considered to be input to the software program defined by source code 102 running on processor 106 as a whole or which produce data considered to be output produced by the software program defined by source code 102 running processor 106 as a whole. In other words, primary functional units 108 may be said to contribute directly to the running of the software program defined by source code 102 on processor 106.

Non-primary functional units 110 may comprise any appropriate number of non-primary functional units. Non-primary functional units 110 may include one non-primary functional unit or a plurality of non-primary functional units. Each non-primary functional unit in non-primary functional units 110 may be controlled by or in accordance with instructions in instruction cache 114.

Governing functional units 118 are examples of non-primary functional units 110. Each governing functional unit in governing functional units 118 may affect the behavior of one or more of primary functional units 108 to improve the operation of the primary functional units 108. One or more governing functional units 118 in processor 106 may control one or more aspects of operation of one or more primary functional units 108 in processor 106. Unlike primary functional units 108, governing functional units 118 may not contribute directly to the running of the software program defined by source code 102 on processor 106 by directly manipulating data in data cache 116 that may be considered data input to or produced as output by the software program defined by source code 102 running processor 106 as a whole.

In accordance with an illustrative embodiment, representative processor architecture model generator 120 may be configured to generate representative processor architecture model 122. Representative processor architecture model 122 is a model of processor 106 that may be used by compiler 100 to generate executable code 104 for processor 106 from source code 102.

In representative processor architecture model 122, representative primary functional units 124 perform operations on data in data cache 126 in accordance with instructions in instruction cache 128. There are no governing functional units or other non-primary functional units represented in representative processor architecture model 122. Operations performed by non-primary functional units 110, such as governing functional units 118, in processor 106 are modeled in representative processor architecture 122 as being performed by representative primary functional units 124.

In accordance with an illustrative embodiment, compiler 100 may be configured to translate source code 102 into representative primary functional unit instructions 130 for modeled representative primary functional units 124. Representative processor architecture model generator 120 may be configured to generate instruction transformations 132. Instruction transformations 132 may be used by instruction transformer 134 to transform representative primary functional unit instructions 130 into executable primary functional unit instructions 136 and executable governing functional unit instructions 138 for primary functional units 108 and governing functional units 118 in processor 106, respectively. Executable governing functional unit instructions 138 may be an example implementation of executable non-primary functional unit instructions for non-primary functional units 110 in processor 106.

Figure 2:
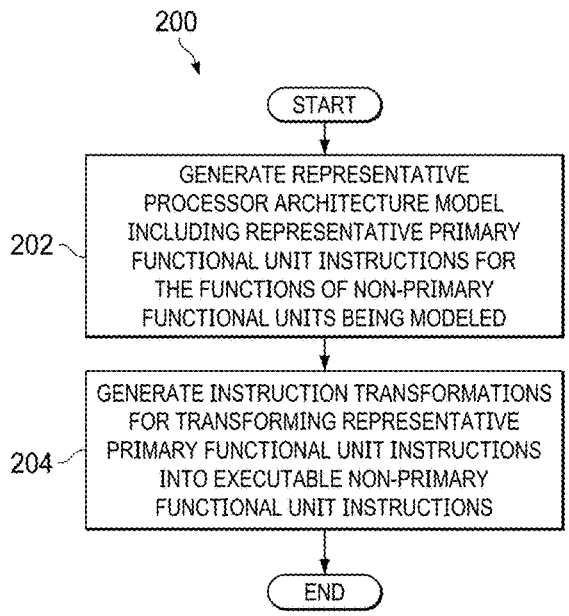
FIG. 2 is a flowchart of a process for generating a compiler to compile executable program code for running on a processor comprising primary functional units and non-primary functional units in accordance with an illustrative embodiment.

Turning to FIG. 2, a flowchart of a process for generating a compiler to compile executable program code for running on a processor comprising primary functional units and non-primary functional units is depicted in accordance with an illustrative embodiment. Process 200 may be implemented, for example, to implement compiler 100 in FIG. 1.

Process 200 may begin by generating a representative processor architecture model including representative primary functional unit instructions for the functions of non-primary functional units in the processor architecture being modeled (operation 202). For example, without limitation, operation 204 may comprise generating a functionally equivalent hardware model that is free of governing functional units or other non-primary functional units and supplementing a set of primary functional unit instructions with a set of pseudo instructions. For example, without limitation, operation 202 may include generating a set of pseudo instructions that neither read nor write governing functional unit registers, that are understood to implicitly modify primary functional unit behavior in the same manner as governing functional unit instructions, and that read and/or write primary functional unit registers such that all ordering dependencies can be expressed via primary functional unit register use-definition relationships.

Instruction transformations for transforming representative primary functional unit instructions that represent instructions for non-primary functional units into executable non-primary functional unit instructions for execution by the non-primary functional units in the processor architecture being modeled are generated (operation 204), with the process terminating thereafter. Operation 204 may comprise generating a final compiler pass that transforms all primary functional unit pseudo instructions into functionally equivalent sequences of governing functional unit instructions.

Figure 3:
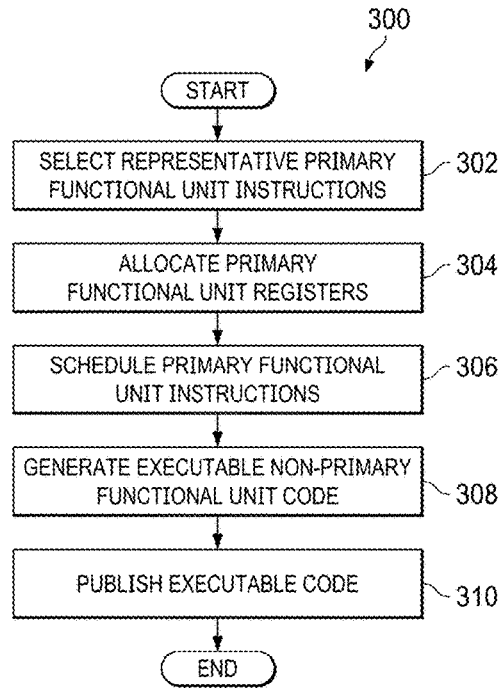
FIG. 3 is a flowchart of a computer-implemented process for compiling executable program code for running on a processor comprising primary functional units and non-primary functional units in accordance with an illustrative embodiment.

Turning to FIG. 3, an illustration of a computer-implemented process for compiling executable program code for running on a processor comprising primary functional units and non-primary functional units is depicted in accordance with an illustrative embodiment. Computer-implemented process 300 may be performed, for example, by compiler 100 in FIG. 1.

Process 300 may begin with selecting representative primary functional unit instructions (operation 302). Operation 302 may include selecting representative primary functional unit instructions for a representative primary functional unit in a modeled representative process architecture in which the representative primary functional unit performs functions that are performed by both primary functional units and non-primary functional units in the processor architecture for which the code is being compile. Similarly, primary functional unit registers may be allocated (operation 304) and primary functional unit instructions may be scheduled (operation 306) for the representative primary functional unit in the representative processor architecture model. At this point executable governing functional unit code or other non-primary functional unit code may be generated (operation 308) by transforming the primary functional unit code. Executable code including executable primary functional unit instructions and executable governing functional unit or other non-primary functional unit code may then be published for running on a processor comprising both primary and non-primary functional units (operation 310), with the process terminating thereafter.

Figure 4:
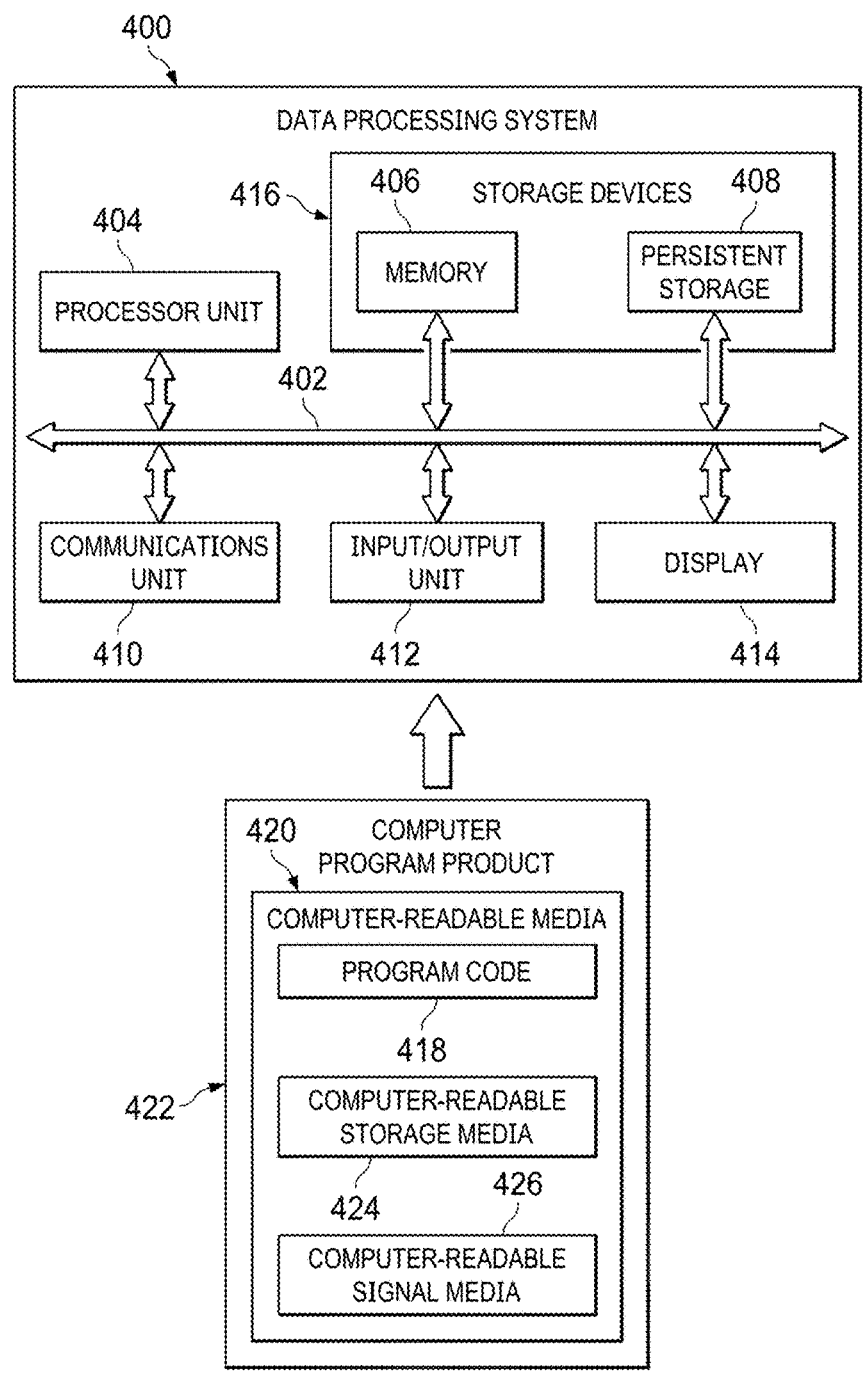
FIG. 4 is an illustration of a data processing system in accordance with an illustrative embodiment.

With reference now to FIG. 4, a diagram of a data processing system is depicted in accordance with an illustrative embodiment. Data processing system 400 is an example of a computer, in which computer-readable program code or program instructions implementing processes of illustrative embodiments, such as compiler 100 in FIG. 1, may be located. In this illustrative example, data processing system 400 includes communications fabric 402, which provides communications between processor unit 404, memory 406, persistent storage 408, communications unit 410, input/output unit 412, and display 414.

Processor unit 404 serves to execute instructions for software applications and programs that may be loaded into memory 406. Processor unit 404 may be a set of one or more hardware processor devices or may be a multi-processor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 406, in these examples, may be, for example, a random-access memory, or any other suitable volatile or non-volatile storage device. Persistent storage 408 may take various forms, depending on the particular implementation. For example, persistent storage 408 may contain one or more devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in this example, provides for communication with other computers, data processing systems, and devices via network communications unit 410 may provide communications using both physical and wireless communications links. The physical communications link may utilize, for example, a wire, cable, universal serial bus, or any other physical technology to establish a physical communications link for data processing system 400. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 400.

Input/output unit 412 allows for the input and output of data with other devices that may be connected to data processing system 400. For example, input/output unit 412 may provide a connection for user input through a keypad, keyboard, and/or some other suitable input device. Display 414 provides a mechanism to display information to a user and may include touch screen capabilities to allow the user to make on-screen selections through user interfaces or input data, for example.

Instructions for the operating system, applications, and/or programs may be located in storage devices 416, which are in communication with processor unit 404 through communications fabric 402. In this illustrative example, the instructions are in a functional form on persistent storage 408. These instructions may be loaded into memory 406 for running by processor unit 404. The processes of the different embodiments may be performed by processor unit 404 using computer-implemented program instructions, which may be located in a memory, such as memory 406. These program instructions are referred to as program code, computer-usable program code, or computer-readable program code that may be read and run by a processor in processor unit 404. The program code, in the different embodiments, may be embodied on different physical computer-readable storage devices, such as memory 406 or persistent storage 408.

Program code 418 is located in a functional form on computer-readable media 420 that is selectively removable and may be loaded onto or transferred to data processing system 400 for running by processor unit 404. Program code 418 and computer-readable media 420 form computer program product 422. In one example, computer-readable media 420 may be computer-readable storage media 424 or computer-readable signal media 426. Computer-readable storage media 424 may include, for example, an optical or magnetic disc that is inserted or placed into a drive or other device that is part of persistent storage 408 for transfer onto a storage device, such as a hard drive, that is part of persistent storage 408. Computer-readable storage media 424 also may take the form of a persistent storage, such as a hard drive, a thumb drive, or a flash memory that is connected to data processing system 400. In some instances, computer-readable storage media 424 may not be removable from data processing system 400.

Alternatively, program code 418 may be transferred to data processing system 400 using computer-readable signal media 426. Computer-readable signal media 426 may be, for example, a propagated data signal containing program code 418. For example, computer-readable signal media 426 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 418 may be downloaded over a network to persistent storage 408 from another device or data processing system through computer-readable signal media 426 for use within data processing system 400. For instance, program code stored in a computer-readable storage media in a data processing system may be downloaded over a network from the data processing system to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to, or in place of, those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a computer-readable storage device in data processing system 400 is any hardware apparatus that may store data. Memory 406, persistent storage 408, and computer-readable storage media 426 are examples of physical storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    a processor;
    a hardware architecture of the processor comprising a primary functional unit, and a non-primary functional unit includes a governing functional unit;
    a representative processor architecture model generator configured to generate a representative processor architecture model comprising generate a set of primary functional unit pseudo instructions that neither read nor write governing functional unit registers, that modify primary functional unit behavior in the same manner as governing functional unit instructions, and that read or write primary functional unit registers such that all ordering dependencies can be expressed via primary functional unit register use-definition relationships;
    a compiler configured to translate source code into representative primary functional unit instructions for a representative primary functional unit in the representative processor architecture model of the hardware architecture, wherein functionality of the non-primary functional unit in the hardware architecture is modeled by the representative primary functional unit in the representative processor architecture model; and an instruction transformer configured to transform the representative primary functional unit instructions into executable non-primary functional unit instructions for the non-primary functional unit in the hardware architecture, wherein transforming the representative primary functional unit instructions into executable non-primary functional unit instructions comprising generating a compiler pass that transforms the set of primary functional unit pseudo instructions into functionally equivalent sequences of governing functional unit instructions.

2. The apparatus of claim 1, wherein the compiler is configured to translate the source code into representative primary functional unit instructions by:

selecting representative primary functional unit instructions for the representative primary functional unit;

allocating registers for the representative primary functional unit instructions; and scheduling the representative primary functional unit instructions.

3. The apparatus of claim 1, wherein the compiler is configured to generate from the source code the executable code comprising the executable non-primary functional unit instructions and executable primary functional unit instructions for the primary functional unit in the hardware architecture.

4. A computer program product for generating executable code for a hardware architecture comprising a primary functional unit and a non-primary functional unit includes a governing functional unit, the computer program product comprising:

a computer readable storage medium having stored thereon:

first program instructions executable by a device to cause the device to generate a representative processor architecture model comprising generating a set of primary functional unit pseudo instructions that neither read nor write governing functional unit registers, that modify primary functional unit behavior in the same manner as governing functional unit instructions, and that read or write primary functional unit registers such that all ordering dependencies can be expressed via primary functional unit register use-definition relationships;

second program instructions executable by a device to cause the device to translate source code into representative primary functional unit instructions for a representative primary functional unit in the representative processor architecture model, wherein functionality of the non-primary functional unit in the hardware architecture is modeled by the representative primary functional unit in the representative processor architecture model; and third program instructions executable by the device to cause the device to transform the representative primary functional unit instructions into executable non-primary functional unit instructions for the non-primary functional unit in the hardware architecture, wherein transforming the representative primary function unit instructions into executable non-primary functional unit instructions comprising generating a compiler pass that transforms the set of primary functional unit pseudo instructions into functionally equivalent sequences of governing functional unit instructions.

5. The computer program product of claim 4, wherein the first second program instructions are executable by the device to:

select representative primary functional unit instructions for the representative primary functional unit;

allocate registers for the representative primary functional unit instructions; and schedule the representative primary functional unit instructions.

6. The computer program product of claim 4 further comprising third program instructions stored on the computer readable storage medium and executable by the device to cause the device to generate from the source code executable primary functional unit instructions for the primary functional unit in the hardware architecture.

* * * * *